United States Patent [19]

Brownlie et al.

[11] Patent Number: 5,145,388

[45] Date of Patent: Sep. 8, 1992

[54] ENCLOSURE FOR CROSSCONNECT TERMINAL BLOCK

[75] Inventors: Alan W. Brownlie, Skaneateles, N.Y.; John W. Derr, New Cumberland, Pa.; Scott A. Keener, Harrisburg, Pa.; James W. Robertson, Oberlin, Pa.; Francis J. Shay, Palmyra, Pa.

[73] Assignee: AMP Incorporated, Harrisburg, Pa.

[21] Appl. No.: 708,407

[22] Filed: May 31, 1991

[51] Int. Cl.5 .............................................. H01R 13/44
[52] U.S. Cl. ................................... 439/142; 174/60; 379/399; 379/442; 439/892
[58] Field of Search ............... 439/133, 142, 144, 147, 439/282, 366, 367, 718, 892, 893; 379/399, 412, 442, 415; 174/60

[56] References Cited

U.S. PATENT DOCUMENTS

| 4,303,296 | 12/1981 | Spaulding | 339/122 R |
|---|---|---|---|
| 4,411,480 | 10/1983 | Gibson | 439/892 |
| 4,505,403 | 3/1985 | Bowden, Jr. et al. | 439/142 |
| 4,560,839 | 12/1985 | Dillard | 179/81 C |
| 4,624,514 | 11/1986 | Smith | 379/412 |
| 4,644,095 | 2/1987 | Bright et al. | 174/50 |
| 4,658,422 | 4/1987 | Sparks | 379/442 |
| 4,694,118 | 9/1987 | Schmidt | 174/41 |
| 4,729,059 | 3/1988 | Wang | 361/356 |
| 4,731,501 | 3/1988 | Clark et al. | 174/65 R |
| 4,749,359 | 6/1988 | White | 439/133 |
| 4,800,588 | 1/1989 | Poster, Jr. | 379/412 |
| 4,890,318 | 12/1989 | Crane et al. | 379/399 |
| 4,910,770 | 3/1990 | Collins et al. | 379/399 |
| 4,985,962 | 1/1991 | Weber | 16/232 |
| 5,006,077 | 4/1991 | Loose et al. | 439/409 |

OTHER PUBLICATIONS

AMP Instruction Sheet IS 3217 "AMP Quiet Front Cross-Connect Terminal Closure 769147-1" Feb., 1991; AMP Incorporated, Harrisburg, Pa.

Keptel Brochure, "Keptel 1642 Protector/Terminal Closure", Nov., 1988; Keptel, Inc. Tinton Falls, N.J.

Raychem System Practice and Installation Instructions, "DTerminator TM XB2 2-Pair Cross Connect Terminal" Oct. 1990; Raychem, Menlo Park Calif.

2 Photographs of Enclosure for Cross Connect Terminal, Raychem Corporation DTerminator XB2.

AT&T Catalog "Outside Plant Systems", pp. ii, iii, 5-3, 5-4; Feb., 1987; AT&T Western Electric, Morristown, N.J.

Primary Examiner—Paula A. Bradley
Attorney, Agent, or Firm—Anton P. Ness

[57] ABSTRACT

An enclosure for terminal blocks for interconnecting conductors of multiconductor cables includes provision for two or more terminal block modules. A lid is pivotably hinged to a box-like base section, with the base section including front and rear walls extending upwardly from a floor, and side walls extending downwardly from a transverse section of the lid into the open regions between the front and rear walls of the base section when the lid is pivoted to its closed position. When the enclosure is mounted vertically the lid is pivotable to an open position overcentered to remain open unassisted. The side walls include ribs having projections which engage upper edges of ridges extending upwardly from side edges of the floor between the front and rear walls, thus camming the lower edges of the side walls inwardly tightly against outwardly facing surfaces of the ridges for sealing.

6 Claims, 4 Drawing Sheets

ENCLOSURE FOR CROSSCONNECT TERMINAL BLOCK

FIELD OF THE INVENTION

The present invention relates to the field of electrical connectors and more particularly to enclosures containing connectors for connecting pairs of signal wires together.

BACKGROUND OF THE INVENTION

In the telecommunications industry telephone cable is introduced to individual telephone sites such as residences, mainly through use of a splice of the signal wires of the cable to respective house wires at a junction located outside the house. The junction is housed within a protective enclosure which is mounted usually to an outside wall of the house. One example of an assembly of a splice terminal block and enclosure therefor is sold by Raychem Corporation under the product identification D'TERMINATOR XB2 (trademark of Raychem Corporation), and the product has the capacity to crossconnect one or two separate telephone lines within the enclosure. Ends of the house cable and the drop cable from the transmission line enter the enclosure; each of the pair of signal wires of each cable is prepared to be spliced to its respective counterpart in the other cable; and the prepared wire ends are then placed within a terminal which is manipulated to penetrate the insulation of both wires to engage the conductors and thus interconnect them. Terminal blocks also provide dielectric protective structure around the splice, and together with the enclosure provide protection from the environment, especially from water, dust, and other contaminants and also from insects and animals. Such enclosures must be capable of being reopened to expose the terminal blocks for service and repair as needed.

One type of terminal block for interconnecting a pair of wires is disclosed in U.S. Pat. No. 5,006,077. A tubular dielectric housing has a center post therein defining an annular cavity. A stationary tubular terminal is affixed within the cavity adjacent the center post; a rotatable tubular terminal is disposed within the cavity concentrically around the stationary terminal and in electrical engagement therewith at all times; and a tubular actuator is also mounted to the housing and is adapted to be rotated between actuated and unactuated positions to rotate the rotatable terminal. A pair of wire-receiving passageways of the assembly are defined along (apertures through) the housing wall, through apertures of both terminals and the actuator, and at least into a center post aperture, all aligned in an unactuated state for a wire end to be inserted thereinto. Upon rotation of the rotatable terminal by the actuator, slot walls of the terminal pierce the wire insulation and engage the wire's conductor. The stationary terminal includes a contact section extending outwardly from the housing including insulation displacement slots for a wire to be inserted thereinto and terminated, for a multiconductor stub cable length to be secured to the enclosure containing a plurality of the terminal blocks, thus defining a cable harness. The two terminal members thus interconnect an appropriate conductor of the stub cable to a wire inserted into the terminal block. A second set of wire-receiving apertures can be utilized to receive a second inserted wire end to be interconnected with the first and with the stub cable conductor.

It would be desired to provide a crossconnect enclosure which is adapted to be mounted to a vertical pole or panel and enable insertion of cables thereinto and conductors of the cables to be crossconnected in respective terminal blocks.

It would also be desirable for such enclosure to have a lid which is pivotably connected thereto and which upon being opened remains secured thereto in a position not interfering with wire termination or servicing activities within the opened enclosure.

SUMMARY OF THE INVENTION

The present invention is an enclosure for one or more terminal blocks for interconnecting or crossconnecting the conductors of at least a pair of two-conductor cables such as are used in the telecommunication industry to provide telephone service to homes and individual residences and offices from a main service cable. The enclosure includes a box section containing one or more terminal blocks, and a lid which is pivotably mounted to the box section. When the box section is mounted to a vertical pole or panel, the lid pivots upwardly and remains attached and in a stable open position during installation when the cables are being interconnected, and also during servicing of the terminal blocks. To facilitate access to the terminal blocks secured within the box section, the side walls of the enclosure are integral with the lid so that when opened the enclosure permits easier wire termination, while the front and back walls remain integral with the bottom wall of the box section.

To facilitate sealing upon closing the enclosure, the side walls include leading edges which extend past an outside surface of a portion of an upstanding ridge of the bottom of the box section along both sides, and include camming projections along their edges which engage the upstanding ridges to cam the side wall edges tightly inwardly against the ridge portion; the front and back walls are disposed at an angle thus assisting both moisture runoff and pivoting of the lid; a rearward edge of each side wall is received within a groove along each side edge of the box section back wall. Additional sealing occurs by a lip along a front rim of the lid latching under a ridge along the top of the box section front wall.

It is an objective of the present invention to provide a protective enclosure adapted for crossconnect terminal blocks to be mounted therewithin which facilitates access to the terminal blocks for splicing together and crossconnecting a pair of wires.

It is also an objective to provide such an enclosure which provides a lid pivotable to a stable open position after the enclosure has been mounted vertically.

It is additionally an objective to provide such a lid which includes the side walls of the enclosure and further provides for the side walls to be pivoted into a sealed condition when the enclosure is closed.

An embodiment of the present invention will now be described by way of example with reference to the accompanying drawings.

DETAILED DESCRIPTION OF THE PREFERRED EMBODIMENT

Figure 1:
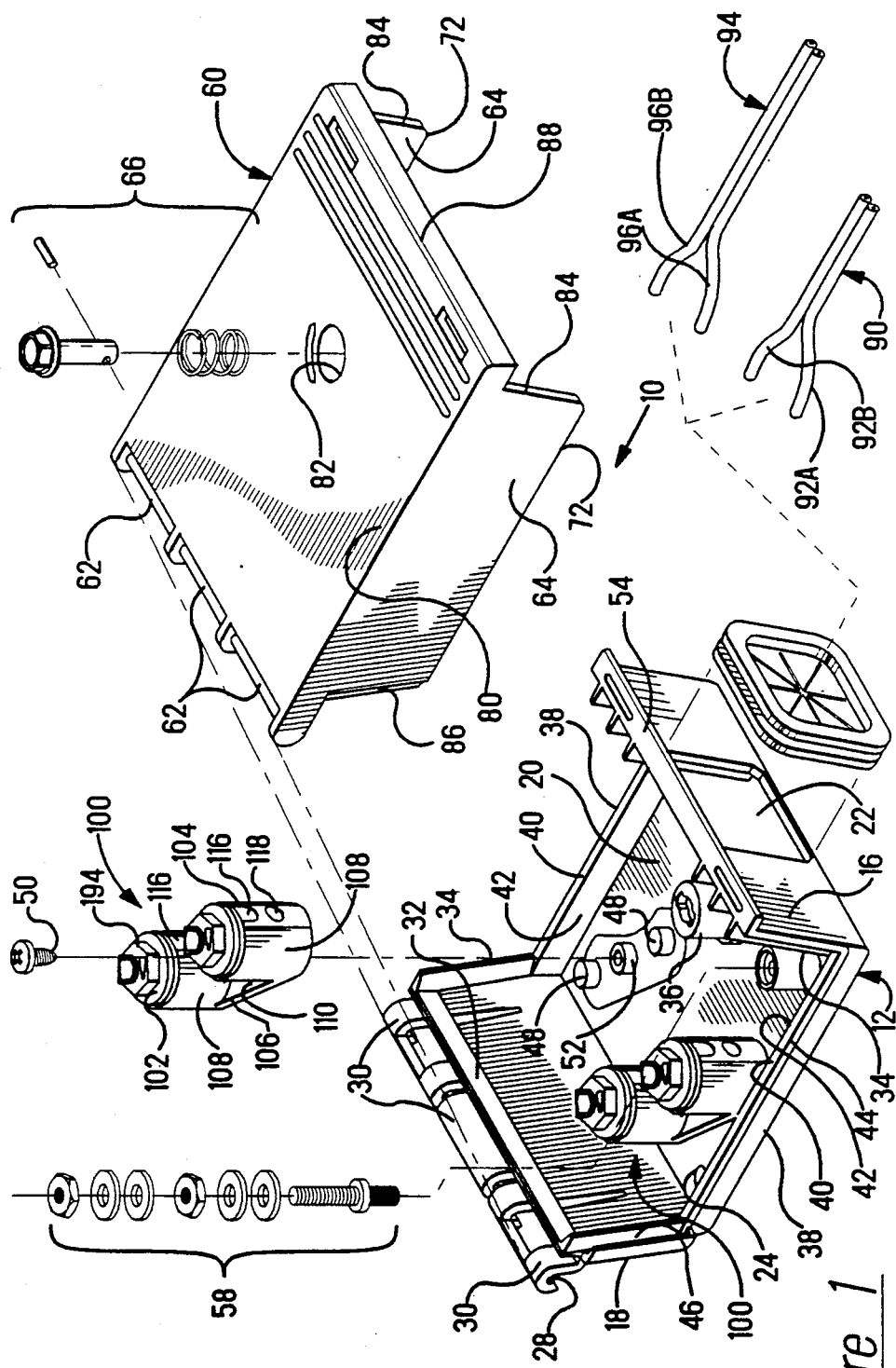
FIG. 1 is an isometric view partially exploded of an enclosure of the invention, containing a pair of the terminal block modules for wires to be spliced therewithin.
Figure 4:
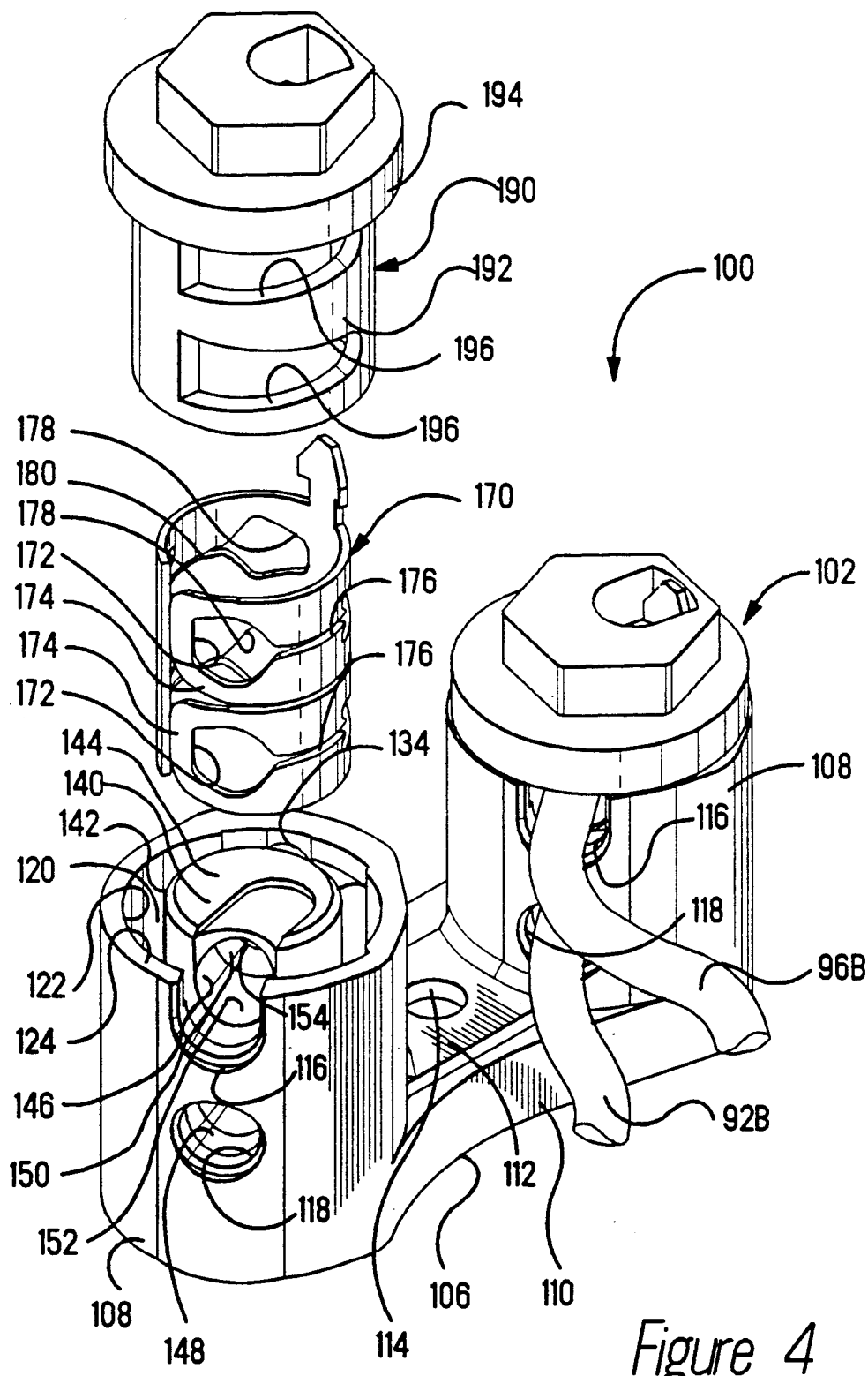
FIG. 4 is an isometric view of a representative terminal block module to be mounted within the enclosure, with the terminal and actuator of one of the terminal blocks exploded from its housing.

Enclosure 10 of the present invention in FIG. 1 is shown to contain two modules 100 each containing a pair of terminal blocks 102,104 of the type disclosed in U.S. patent application Ser.No. 07/708,405 filed May 31, 1991 and assigned to the assignee hereof, and discussed in greater detail with respect to FIG. 4. Enclosure 10 includes a box-like body section 12 and a lid 60 pivotably attached thereto, with body section 12 including front and rear walls 16,18 extending upwardly and angled outwardly from bottom wall 20 at an angle of about 10° from perpendicular. Drop cable 90 exits enclosure 10 at grommeted exit 22 through front wall 16 of enclosure body 12 and includes first and second insulated conductor wires 92A,92B; similarly house cable 94 exits at grommeted exit 22 and includes third and fourth conductor wires 96A,96B which are spliced with first and second wires 92A,92B respectively in terminal blocks 102,104 of one of modules 100. Enclosure 10 has a ground contact 58 for connection of shielding of certain types of drop cables to ground wires (not shown) leading to outside ground for lightning protection. Enclosure body 12 has flanged mounting holes 24 through bottom wall or floor 20 enabling mounting by conventional screw fasteners 26 to a wall or to a post 98 for example, such as is shown in FIG. 2.

Figure 2:
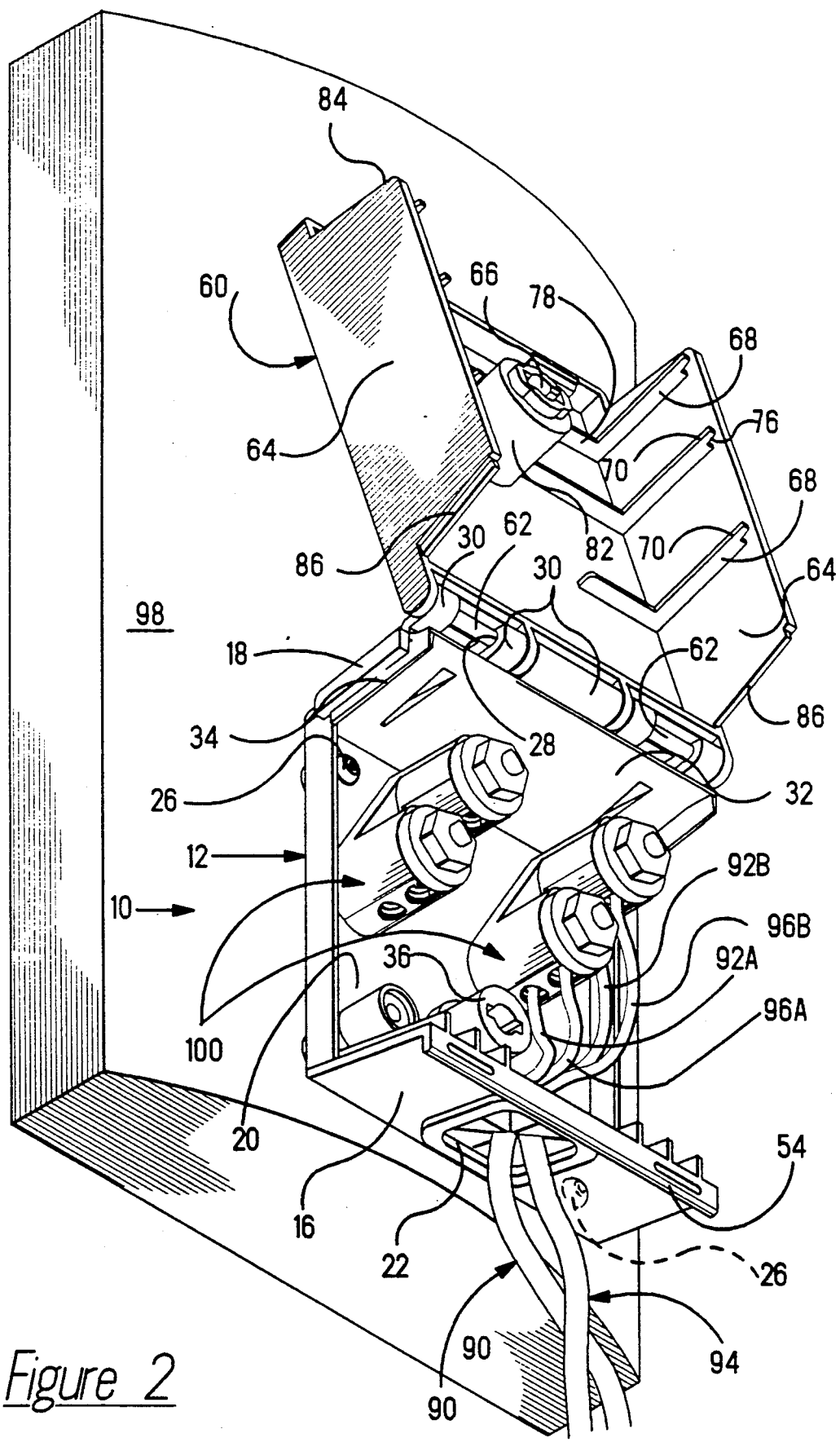
FIG. 2 is an isometric view of the enclosure mounted vertically with its lid fully opened.

Enclosure lid 60 secured to, and is pivotable with respect to body 12 by means of dowels 62 molded integrally with lid 60 and received into and held within arcuate slots 28 of hinge hooks 30 integrally molded along the upper edge 32 of rear wall 18 and aligned to define a pivot axis proximate the upper edge 32 of rear wall 18, as is discussed in greater detail with respect to FIG. 2. Such pivot and hinge mechanism is disclosed in U.S. patent application Ser. No. 07/708,401 filed May 31, 1991 and assigned to the assignee hereof; however, other hinge mechanisms may be used with the enclosure of the present invention. Lid 60 is shown to include side walls 64 for enclosure 10, permitting enclosure body 12 to be open along sides 34 thereof between front wall 16 and rear wall 18 allowing unimpeded access to terminal blocks 102,104 to facilitate splicing of the wire ends when enclosure 10 is opened. Lid 60 is locked to body section 12 into a closed position by spring-loaded lock assembly 66 secured to lid 60 and recessed within well 82 thereof, best seen in FIG. 3; lock assembly 66 is rotatable about a quarter turn by use of a tool commonly available in the telecommunication repair and service industry, in cooperation with lock socket 36 along bottom wall 30.

FIG. 2 illustrates enclosure 10 mounted in position vertically on a pole 98, with lid 60 pivoted to a full open position. With hinge hooks 30 holding dowels 62 at the now-forwardmost upper edge 32 of back wall 18, lid 60 is pivotable overcenter to a stable rest position, allowing free access to the inside region of enclosure 10 for termination of wires 92A,96A;92B,96B and for servicing. The overcenter rest position is also assisted by the slight angle of back wall 18 sloping favorably downwardly toward floor 20 and pole 98, which also assists water runoff toward the pole and away from the front of enclosure 10 in its vertical mounted orientation. The stable overcenter open lid position is an advantage over other prior art enclosures where the lid must be held or otherwise assisted in remaining in an open position when the enclosure is mounted to a vertical surface and the lid must be opened relatively upwardly or else detached and temporarily removed.

Figure 3:
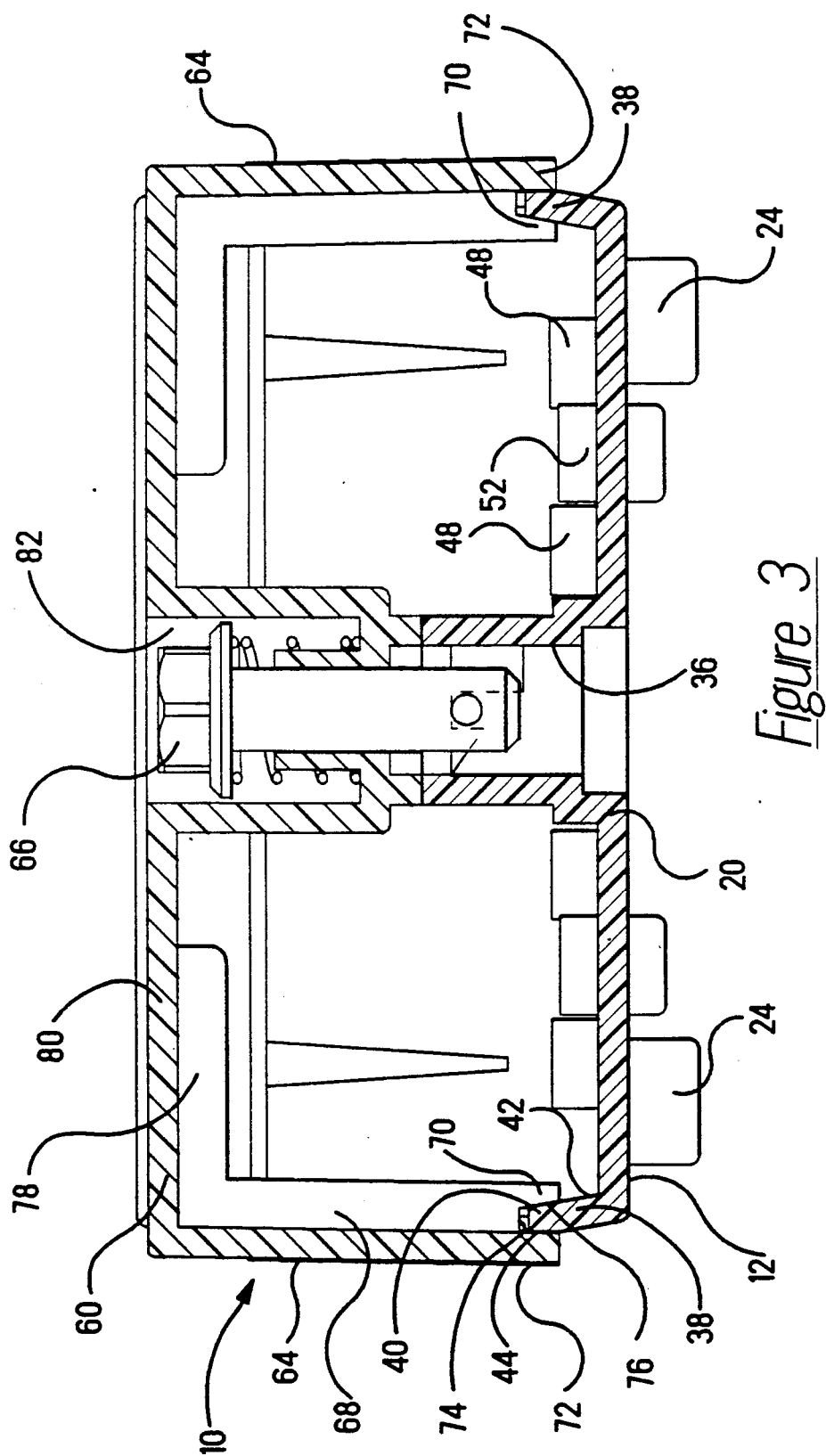
FIG. 3 is a cross-sectional view of the enclosure in a closed state showing the sealing of the side walls and the bottom.

In FIG. 3 the sealing of the side walls with the enclosure bottom is more clearly shown. Ridge sections 38 extend upwardly and slightly outwardly from floor 20 along sides 34 of base section 12, to upper edges 40. Lid 60 includes a plurality of ribs 68 extending vertically along the inside surfaces of side walls 64 and include projections 70 inside of lower edges 72 of side walls 64, defining slots 74 which receive upper edges 40 of ridge sections 38 thereinto when lid 60 is closed. Projections 70 include angled cam surfaces 76 which initially engage upper ridge edges 40 along inside surfaces 42 thereof and then are cammed slightly inwardly when lid 60 is fully closed and locked, pulling lower edges 72 of side walls 64 inwardly for inner surfaces of lower edges 72 to be pressed tightly against outward surfaces 44 of upper ridge edges 40 to generate a seal therealong. Ribs 68 have transverse sections 78 which continue along the inside surface of transverse section 80 of lid 60 and thereby provide strength to side walls 64 and the corner thereof with transverse section 80.

Front edges 84 are pulled tightly against side edges of front wall 16 when projections 70 pull lower edges 72 tightly against ridge sections 42. Rearward edge flanges 86 of side walls 64 are received within grooves 46 of back wall 18, as seen in FIG. 1, and are urged tightly thereinto when lid 60 is fully closed and locked. Also, a downwardly extending rim 88 along the front of lid 60 passes by an outwardly extending lip 54 atop front wall 16 for an inwardly extending projection (not shown) of rim 88 to latch thereunder across the front to assist in sealing.

In FIGS. 1 and 4 representative module 100 includes an integral housing member 106 molded of plastic. Module 100 includes a pair of terminal blocks 102,104 each of which is a generally cylindrical housing section 108 of housing member 106 coextending from a common base section 110. Recesses below each housing section 108 each receive positioning embossments 48 rising from floor 20 of enclosure 10. Between housing sections 108 base section 110 defines a mounting flange 112 and includes a profiled mounting aperture 114 adapted to enable a fastener 50 to be threaded into apertured embossment 52 rising from enclosure floor 20. When mounted within enclosure 10, housing modules 100 are so positioned and oriented with respect to each other such that wire entrance apertures 116,118 of each housing section 108 thereof are generally aligned with grommeted cable exit 22 to facilitate insertion of ends of wires 92A,96A or 92B,96B thereinto for being spliced or interconnected together.

While one type of terminal block is shown and described as being preferred to be used with the present invention, other versions of terminal blocks, including nonrotary kinds, may be used with the enclosure of the present invention. The use of modular housings for terminal blocks which are mountable within the enclosure of the present invention, simplifies the fabrication of the enclosure.

Regarding terminal blocks 102,104 shown in FIG. 4 for use with the enclosure of the present invention, each cylindrical housing section 108 includes a large annular cavity 120 defined by cylindrical sidewall 122 (shown oriented vertically) extending to annular edge 124. A center post 140 is molded integrally to base section 110 of housing module 100 within each cavity 120 and having an outer, generally cylindrical surface 142 radially spaced from sidewall 122 thereof, with a leading end 144 extending slightly beyond annular edge 124. Wire-receiving passageways 146,148 of center post 140 are aligned with associated ones of wire entrance apertures 116,118 of sidewall 122 for eventual receipt of ends of wires 92A,96A or 92B,96B therethrough for splicing or interconnection. While wire entrance apertures 116,118 of sidewall 122 are wide enough to receive the larger 18 AWG size wire therethrough, wire-receiving passageways 146,148 are profiled as disclosed in U.S. Pat. No. 5,006,077 to receive and stop the end of a larger 18 AWG wire at tapered transition section 150 located between larger diameter passageway portion 152 and smaller diameter passageway portion 154. Passageways 146,148 are adapted, with tapered transition portion 150 acting as a lead-in to prevent stubbing, to permit the end of a smaller 24 AWG size wire to pass completely therethrough and exit the center post 140 and continue until stopped by stop recess 134 in sidewall 122 opposed from wire entrance apertures 116,118.

Annular cavity 120 is dimensioned to be wide enough radially, between sidewall 122 and center post surface 142, to receive tubular terminal 170 and tubular actuator 190 inserted thereinto from annular edge 124 and concentrically about center post 140. A pair of large wire-receiving holes 172 are stamped into each of contact sections 174 and include tapered insulation displacement slots 176 defined between conductor-engaging edges. A pair of small wire-receiving holes 178 similarly including tapered insulation displacement slots 180 defined between conductor-engaging edges, are stamped into contact sections 174 at locations which are aligned with and opposed from large wire-receiving holes 172 when terminal 170 has been formed into its appropriate tubular shape 104.

Actuator 190 includes a tubular semicylindrical body section 192 to flange 194 having a lug formed thereon which includes a probe-receiving opening thereinto, for receipt of a probe to engage a probe-engageable tab of terminal 170 disposed therein. A pair of large profiled slots 196 is formed on one side of tubular body section 192 associated with wire-receiving apertures 116,118 of housing section 108. Each large slot 196 extends laterally from a wide first end to a narrow and rounded second end.

The terminal block preferably is designed to include the wire selection feature as is disclosed in U.S. Pat. No. 5,006,077, whereby either a larger gage 18 AWG or a smaller gage 24 AWG wire is terminable by the terminal block. The end of either size wire extends through one of apertures 116,118 of side wall 122, slot 196 of actuator 190, large wire-receiving hole 172 of terminal 170 and into large diameter portion of an aperture through center post 140. A larger gage wire will abut a tapered transition portion to a small diameter aperture portion within center post 140 and be stopped thereby from further insertion; a smaller gage wire will continue to be inserted through the smaller diameter portion, smaller wire-receiving hole 178 of terminal 170 through a clearance portion of actuator 190 and into recess 134 along side wall 122 of housing section 108 and be stopped.

Upon full wire insertion and rotation of actuator 190 by its lug, actuator 190 in turn urges terminal 170 to rotate within cavity 120. During rotation until side edges of insulation displacement slot 174 penetrate or cut the insulative material of the wire, engaging the central conductor of a larger gage wire. Simultaneously, for a smaller gage wire, side edges of insulation displacement slot 180 penetrate or cut the insulative material of a smaller gage wire extending therethrough, if smaller gage wires are being spliced, until engaging the central conductor of the smaller gage wire. Terminal 170 thus electrically connects both wires of either gage upon full rotation of actuator 190 from the unactuated position to the actuated position. Upon full rotation of actuator 190 during splicing, narrow ends of large profiled slots 196 thereof engage and are forced compressibly into the insulation of either large or small gage wire, to define a strain relief on the wires which serves to protect the integrity of the termination of the central conductors to the terminal. Commonly the terminal block will be filled with a dielectric grease or gel to embed all metal surfaces and seal the surfaces against moisture and corrosion.

The present invention is modular and permits one enclosure to have provision for securing therein two or more such terminal block modules as desired depending upon the number of telephone wires to be crossconnected at a particular site. Embossments 48 are positioned to orient modules 100 for wire-receiving apertures thereof to be aligned generally with cable exit 22 without one module interfering with another.

Modifications and variations may be made to the enclosure which are within the spirit of the invention and the scope of the claims.

What is claimed is:

1. An enclosure for terminal blocks for connecting to and splicing a pair of wires, comprising:
    a body section having a floor, front wall and rear wall and defining opposed open sides between said front and rear walls, said body section adapted to contain in an interior region terminal blocks for interconnecting pairs of wires, and including a cable exit;
    a lid having a transverse section and opposed side walls, each said side wall shaped and dimensioned to complement said open sides between said front and rear walls of said body section to define an enclosure completely surrounding said interior region when said lid is positioned in a closed position;
    means for pivotably securing said lid to said body section defining an assembly and enabling rotating said lid between open and closed positions with respect to said body section; and
    means for securing said lid to said body section in said closed position;
    said pivoting means being defined along one of said front and rear walls enabling pivoting of said lid to said closed position with said opposed side walls extending into said open sides between said front and rear walls of said body section.

2. The enclosure as set forth in claim 1 wherein said lid is pivotably attached to said rear wall along an upper edge of said rear wall remote from said floor, and said lid is pivotable over center in said open position when said assembly is disposed in a vertical orientation with said rear wall uppermost.

3. The enclosure as set forth in claim 2 wherein said rear wall is angled with respect to said floor to extend forwardly and outwardly therefrom, thereby sloping downwardly and rearwardly when said assembly is disposed in a vertical orientation with said rear wall uppermost.

4. The enclosure as set forth in claim 1 wherein inner surfaces of said side walls each include at least one rib section extending from said transverse lid section to conclude in a projection opposed from a lower edge of said side wall, and said body section including ridge sections extending upwardly and slightly angled outwardly from said floor along sides thereof between said front and rear walls to upper edges adjacent said open sides, said projection of each said rib section defining a slot adapted to receive thereinto an opposed portion of said upper edge of said ridge section corresponding to said side wall.

5. The enclosure as set forth in claim 4 wherein said rib section projection includes an outwardly facing surface which is angled generally to correspond with an inside surface of said ridge section upper edge and bear thereagainst upon full closure of said lid, thereby defining a cam surface whereby said ridge section upper edge urges said projection slightly inwardly thus pulling said side wall lower edge incrementally inwardly and tightly against an outwardly facing surface of said ridge section upper edge to seal thereagainst.

6. The enclosure as set forth in claim 4 wherein said side walls include forward and rearward edges, said rear wall of said base section including forwardly extending flanges proximate side edges thereof defining grooves adapted to receive said rearward edges of said side walls thereinto in a snug fit upon full closure of said lid.

* * * * *